US012117023B2

(12) United States Patent
Wang et al.

(10) Patent No.: US 12,117,023 B2
(45) **Date of Patent: *Oct. 15, 2024**

(54) TURBINE FRACTURING APPARATUS

(71) Applicant: YANTAI JEREH PETROLEUM EQUIPMENT & TECHNOLOGIES CO., LTD., Shandong (CN)

(72) Inventors: Jianwei Wang, Shandong (CN); Yongcheng Liu, Shandong (CN); Yuguo Tang, Shandong (CN); Zhongzhang Ma, Shandong (CN); Fuhong Li, Shandong (CN)

(73) Assignee: Yantai Jereh Petroleum Equipment & Technologies Co., Ltd., Yantai (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/320,032

(22) Filed: May 18, 2023

(65) Prior Publication Data

US 2023/0287908 A1 Sep. 14, 2023

Related U.S. Application Data

(63) Continuation of application No. 17/471,906, filed on Sep. 10, 2021, now Pat. No. 11,686,329.

(30) Foreign Application Priority Data

Jun. 29, 2021 (CN) ......................... 202110724198.8

(51) Int. Cl.

*F15B 11/17* (2006.01)
*E21B 43/26* (2006.01)
(Continued)

(52) U.S. Cl.

CPC ........... *F15B 11/17* (2013.01); *E21B 43/2607* (2020.05); *F04B 17/05* (2013.01); *F04B 23/06* (2013.01);
(Continued)

(58) Field of Classification Search

CPC ............ F15B 11/17; F15B 2211/20507; F15B 2211/20576; F15B 2211/251;
(Continued)

(56) References Cited

U.S. PATENT DOCUMENTS

| | | | | |
|---|---|---|---|---|
| 11,686,329 B2 * | 6/2023 | Wang | ..................... | F04B 53/18 166/177.5 |
| 2013/0306322 A1 | 11/2013 | Sanborn | | |

(Continued)

FOREIGN PATENT DOCUMENTS

| | | |
|---|---|---|
| CN | 203362659 U | 12/2013 |
| CN | 207999397 U | 10/2018 |

(Continued)

*Primary Examiner* — James G Sayre
(74) *Attorney, Agent, or Firm* — Crowell & Moring LLP

(57) ABSTRACT

Disclosed is a turbine fracturing apparatus. The turbine fracturing apparatus includes: a main power assembly and an auxiliary power assembly. The main power assembly includes a first power source and a piston pump connected to the first power source; the first power source outputs power to the piston pump, and the piston pump outputs a first liquid. The auxiliary power assembly includes a second power source, a load sensitive system connected to the second power source, and an auxiliary power device; the second power source outputs power to the load sensitive system, the load sensitive system is connected to the auxiliary power device and outputs a second liquid for the auxiliary power device. The first liquid is different from the second liquid, and the first liquid and the second liquid have certain pressure. The load sensitive system is configured to regulate a pressure of the second liquid in real time according to pressure of the second liquid required by the auxiliary power device.

20 Claims, 5 Drawing Sheets

(51) Int. Cl.
*F04B 17/05* (2006.01)
*F04B 23/06* (2006.01)

(52) U.S. Cl.
CPC ............... *F15B 2211/20507* (2013.01); *F15B 2211/20576* (2013.01); *F15B 2211/251* (2013.01)

(58) Field of Classification Search
CPC ...... E21B 43/2607; E21B 43/26; F04B 17/05; F04B 23/06; F04B 23/04; F04B 53/18; F04B 49/22; F04B 9/12; F04B 53/08; F01D 15/08; F01D 15/12
See application file for complete search history.

(56) References Cited

U.S. PATENT DOCUMENTS

| | | | |
|---|---|---|---|
| 2016/0105022 | A1 | 4/2016 | Oehring |
| 2017/0302135 | A1 | 10/2017 | Cory |
| 2019/0245348 | A1 | 8/2019 | Hinderliter |
| 2020/0263528 | A1 | 8/2020 | Fischer |
| 2021/0285432 | A1 | 9/2021 | Ji |
| 2021/0388760 | A1 | 12/2021 | Feng |
| 2022/0290549 | A1 | 9/2022 | Zhang |

FOREIGN PATENT DOCUMENTS

| | | | |
|---|---|---|---|
| CN | 209649309 | U | 11/2019 |
| CN | 112983382 | A | 6/2021 |
| WO | 2016/074509 | A1 | 5/2016 |

* cited by examiner

TURBINE FRACTURING APPARATUS

CROSS-REFERENCE OF RELATED APPLICATION

For all purposes, the present application is a continuation of and claims the benefit of priority to U.S. patent application Ser. No. 17/471,906 filed on Sep. 10, 2021, which claims the benefit of priority to Chinese patent application No. 202110724198.8, filed on Jun. 29, 2021. The entireties of these prior patent applications are incorporated herein by reference as part of the present application.

TECHNICAL FIELD

Embodiments of the present disclosure relates to a turbine fracturing apparatus.

BACKGROUND

At present, turbine engines are widely applied to fracturing apparatus of oil fields due to the advantages such as small size, light weight, high power, good fuel economical efficiency and the like. Besides the turbine engine serving as a main power for driving a piston pump to do work, the turbine fracturing apparatus is necessarily equipped with a set of auxiliary power sources to drive a set of hydraulic systems to provide power to all actuating components of the whole machine.

SUMMARY

Embodiments of the present disclosure provides a turbine fracturing apparatus, comprising: a main power assembly, comprising a first power source and a piston pump connected to the first power source, wherein the first power source outputs power to the piston pump, and the piston pump outputs a first liquid; and an auxiliary power assembly, comprising a second power source, a load sensitive system connected to the second power source, and an auxiliary power device, wherein the second power source outputs power to the load sensitive system, the load sensitive system is connected to the auxiliary power device and outputs a second liquid for the auxiliary power device, the first liquid is different from the second liquid, and the first liquid and the second liquid have certain pressure; wherein the load sensitive system is configured to regulate a pressure of the second liquid in real time according to pressure of the second liquid required by the auxiliary power device.

For example, the auxiliary power device comprises a plurality of actuating mechanisms configured for providing auxiliary power to the main power assembly, and the plurality of actuating mechanisms comprise a first power source driving device, a lubricating assembly driving device and a heat dissipating assembly driving device; the load sensitive system comprises: a load sensitive pump, configured for providing the second liquid; and a load sensitive control device, connected with the load sensitive pump and comprising a control valve group, and the control valve group is connected with the first power source driving device, the lubricating assembly driving device and the heat dissipating assembly driving device; the second liquid with the regulated pressure is outputted from the load sensitive pump and conveyed into the first power source driving device, the lubricating assembly driving device and the heat dissipating assembly driving device through the control valve group.

For example, the main power assembly further comprises: a gearbox, arranged between the first power source and the piston pump; a lubricating device, comprising a piston pump lubricating assembly for lubricating the piston pump and a gearbox lubricating assembly for lubricating the gearbox; and a heat dissipating device, comprising a lubricant heat dissipating assembly for cooling a lubricant; wherein the first power source driving device drives the first power source; the lubricating pump driving device comprises a first lubricating driving assembly and a second lubricating driving assembly, the first lubricating driving assembly drives the piston pump lubricating assembly, and the second lubricating driving assembly drives the gearbox lubricating assembly; and the heat dissipating assembly driving device drives the lubricant heat dissipating assembly.

For example, the main power assembly further comprises: an exhaust device, the exhaust device is connected with a first end of the first power source, and a second end of the first power source is connected with the gearbox; wherein the plurality of actuating mechanisms of the auxiliary power assembly further comprise an oil cylinder for the exhaust device; and wherein the control valve group is further connected with the oil cylinder and configured to drive the oil cylinder, and the control valve group is further connected with a brake caliper of the gearbox and configured to drive the brake caliper.

For example, the control valve group comprises a plurality of control valves, the load sensitive control device further comprises a pressure comparison valve, the pressure comparison valve is communicated with the plurality of control valves and configured to compare the pressure of the second liquid in the plurality of control valves and feed back highest liquid pressure required by the plurality of actuating mechanisms to the load sensitive pump, and the load sensitive pump regulates the pressure of the second liquid according to the highest liquid pressure.

For example, the load sensitive pump is configured as that: a standby pressure of an outlet of the load sensitive pump is P1 on condition that no liquid pressure signal is received, and a pressure of the outlet of the load sensitive pump is P1+P, on condition that a liquid pressure signal P is received.

For example, the auxiliary power device comprises a first group of actuating mechanisms and a second group of actuating mechanisms, wherein the load sensitive system comprises: at least one load sensitive pump, configured for providing the second liquid and comprising a first load sensitive pump and a second load sensitive pump; a first load sensitive control device, connected with the first load sensitive pump and comprising a first control valve group, wherein the first control valve group is connected with the first group of actuating mechanisms; and a second load sensitive control device, connected with the second load sensitive pump and comprising a second control valve group, wherein the second control valve group is connected with the second group of actuating mechanisms; wherein the second liquid with the regulated pressure is outputted from the first load sensitive pump and then conveyed into the first group of actuating mechanisms through the first control valve group; the second liquid with the regulated pressure is outputted from the second load sensitive pump and then conveyed into the second group of actuating mechanisms through the second control valve group; and wherein a driving device in the first group of actuating mechanisms is different from a driving device in the second group of actuating mechanisms.

For example, the first control valve group comprises a plurality of first control valves, and the second control valve group comprises a plurality of second control valves; the first load sensitive control device further comprises a first pressure comparison valve, the first pressure comparison valve is communicated with the plurality of first control valves and configured to compare the pressure of the second liquid in the plurality of first control valves and feed back a first highest liquid pressure required by the first group of actuating mechanisms to the first load sensitive pump, and the first load sensitive pump regulates the pressure of the second liquid according to the first highest liquid pressure; and the second load sensitive control device further comprises a second pressure comparison valve, the second pressure comparison valve is communicated with the plurality of second control valves and configured to compare the pressure of the second liquid in the plurality of second control valves and feed back a second highest liquid pressure required by the plurality of second groups of actuating mechanisms to the second load sensitive pump, and the second load sensitive pump regulates the pressure of the second liquid according to the second highest liquid pressure.

For example, the main power assembly further comprises: a gearbox, arranged between the first power source and the piston pump; and an exhaust device, the exhaust device is connected with a first end of the first power source, and a second end of the first power source is connected with the gearbox; and the first group of actuating mechanisms comprises a driving device for the first power source, a driving device for a heat dissipating device and a driving device for a lubricating device; and the second group of actuating mechanisms comprises a driving device for the exhaust device.

For example, the load sensitive system further comprises: a liquid storage tank configured to store the second liquid; both the first load sensitive pump and the second load sensitive pump are connected with the liquid storage tank and configured to suck the second liquid; and the first load sensitive pump regulates the pressure of the second liquid and provides the second liquid with the regulated pressure to the first load sensitive control device, and the second load sensitive pump regulates the pressure of the second liquid and provides the second liquid with the regulated pressure to the second load sensitive control device.

For example, the first power source comprises an air compressor guide vane valve; the auxiliary power assembly further comprises a pressure reducing device, and the pressure reducing device is communicated with both of the second control valve group and the air compressor guide vane valve; and the second liquid is outputted from the second control valve group and then conveyed to the air compressor guide vane valve through the pressure reducing device, and the pressure reducing device is configured to control the pressure of the second liquid in the air compressor guide vane valve to be constant pressure Pc.

For example, the first load sensitive pump is configured as that a standby pressure of an outlet of the first load sensitive pump is P1 on condition that no liquid pressure signal is received, and a pressure of the outlet of the first load sensitive pump is P1+P, on condition that a liquid pressure signal P is received; the second load sensitive pump is configured as that a standby pressure of an outlet of the second load sensitive pump is P1+Pc on condition that no liquid pressure signal is received, a pressure of the outlet of the second load sensitive pump is P1+P on condition that a liquid pressure signal P is received.

For example, the first liquid comprises a fracturing liquid, and the second liquid comprises a hydraulic oil; and the fracturing liquid has a highest pressure of 10000 psi and a maximal flow of 2.7 $m^3$/min, the hydraulic oil has a highest pressure of 3500 psi and a maximal flow of 500 L/min.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
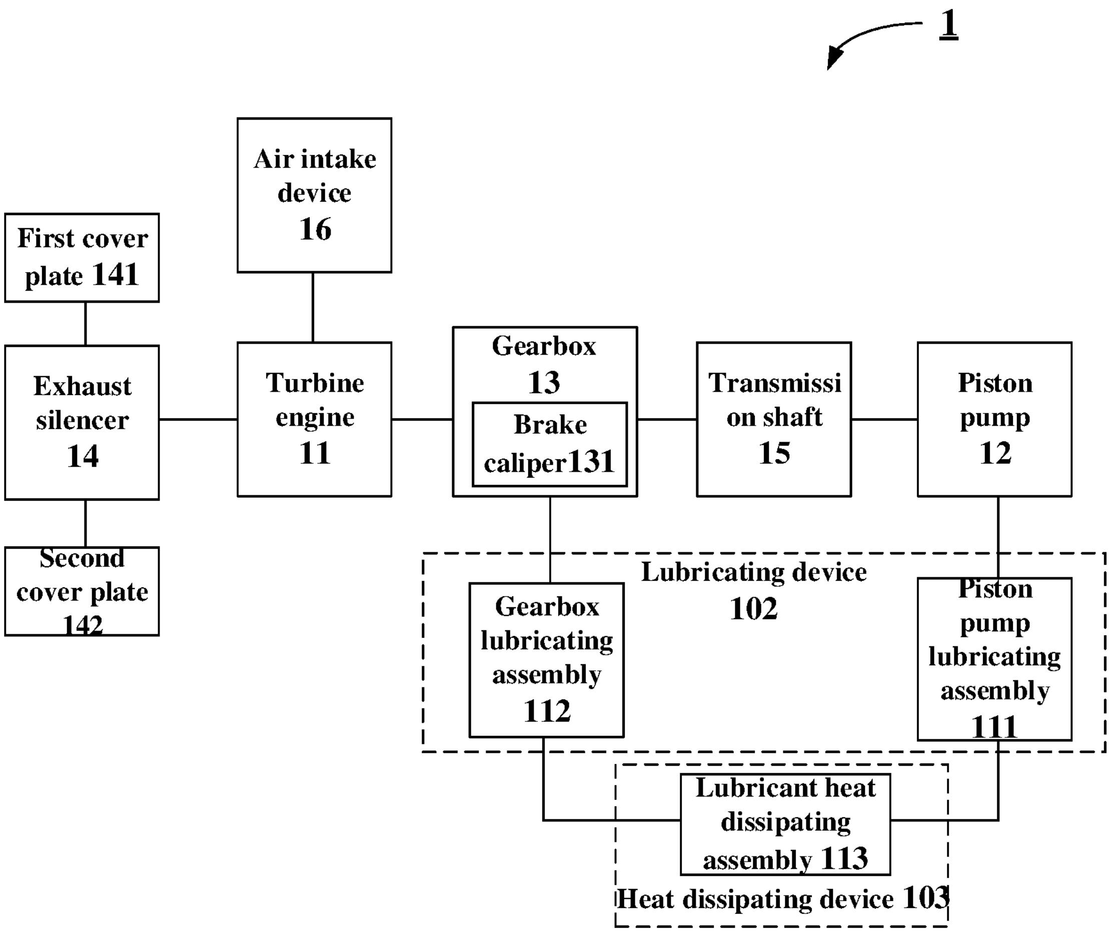
FIG. 1 is a structural schematic diagram of a turbine fracturing apparatus provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising." "includes," "including." etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On." "under," "right." "left" and the like are only configured to indicate relative position relationship, and when the position of the object which is described is changed, the relative position relationship may be changed accordingly.

In the present disclosure, a turbine fracturing apparatus includes a main power assembly and an auxiliary power assembly. The main power assembly includes a turbine engine, a gearbox and a piston pump; and the turbine engine drives the piston pump to do work through the gearbox. It is necessary to utilize a hydraulic pump to pump gearbox oil to forcibly lubricate the gearbox during the operation. It is also necessary to utilize a hydraulic pump to pump piston pump lubricating oil to forcibly lubricate the piston pump during the operation. Because of high transmission power of the power assembly, the turbine engine oil, the gearbox lubricating oil and the piston pump lubricating oil all need external heat radiators to dissipate the heat so as to keep the temperature of the lubricating oil stable.

Generally, the gearbox lubricating hydraulic pump, the piston pump lubricating hydraulic pump and a heat radiator fan are driven by three hydraulic motors respectively. Other actuating components, such as two rainproof cover plates of an exhaust silencer of the turbine engine, are opened and closed by adopting two hydraulic oil cylinders as power to drive a connecting rod structure. The turbine engine is started also by driving the hydraulic motor through hydraulic transmission. When the turbine engine is started, the operation of the piston pump is not allowed, and at this time, the brake of the gearbox is also implemented by hydraulically driving a brake caliper.

It can be seen that in the auxiliary power assembly of the turbine fracturing apparatus, various actuating components including the piston pump lubricating hydraulic pump, a gearbox lubricating hydraulic pump, a lubricating oil heat radiator fan, two oil cylinders of the cover plate of the exhaust silencer, a start motor of the turbine engine and the brake caliper of the gearbox are necessary to connect hydraulic pumps, respectively. The hydraulic pump converts the mechanical energy into hydraulic energy for driving the corresponding actuating components. The above method has the advantages that the power output by the hydraulic pump is adaptive to the power required by the actuating components, so that the loss and waste of the total power of the system are reduced. The disadvantage is that multiple hydraulic pumps need to be installed on a transfer case, which leads to excessively large size of the transfer case; and moreover, multiple hydraulic pumps makes the cost of the fracturing apparatus very high.

To solve the above problems, there is provided an improved solution. An output shaft of the engine is configured to drive one or two variable displacement piston pumps directly (for example, two variable displacement piston pumps are used; the two variable displacement piston pumps are installed in a manner of arranging one in front and another in rear; and the variable displacement piston pump close to the engine is provided with an auxiliary installation flange and configured to drive the rear piston pump) to convert the mechanical energy into hydraulic energy, and the hydraulic energy is allocated by various control valves to various actuating components. When in work, the hydraulic pump always keeps certain constant pressure, which is the highest working pressure required by all actuating components. The flow of the hydraulic liquid outputted by the hydraulic pump is controlled by various control valves. The above method has the characteristics that the quantity of hydraulic pumps is small, and the hydraulic pumps may be connected with the engine through a conversion flange, thereby omitting the transfer case, and reducing the overall cost. Moreover, each control valve may control the output flow of the hydraulic pump according to the working condition of the actuating components. The above method has the disadvantage that when the load of each actuating component is changed in the working process, the hydraulic pump always keeps the preset constant pressure, thus the power loss of the system power is large, and the economical efficiency of the energy consumption of the hydraulic system is poor.

At least one embodiment of the present disclosure provides a turbine fracturing apparatus, which includes a main power assembly and an auxiliary power assembly. The main power assembly includes a first power source and a piston pump connected to the first power source, and the first power source outputs power to the piston pump, and the piston pump outputs a first liquid. The auxiliary power assembly includes a second power source, a load sensitive system connected to the second power source, and an auxiliary power device. The second power source outputs power to the load sensitive system, the load sensitive system is connected to the auxiliary power device and outputs a second liquid for the auxiliary power device. The first liquid is different from the second liquid, and the first liquid and the second liquid have certain pressure. The load sensitive system is configured to regulate the pressure of the second liquid in real time according to the pressure of the second liquid required by the auxiliary power device.

In the turbine fracturing apparatus provided by at least one embodiment of the present disclosure, the load sensitive system is applied to the turbine fracturing apparatus, so that the pressure of the liquid outputted by the load sensitive system is always associated with the actual pressure required by the auxiliary power device, that is, the load sensitive system can regulate the pressure of the second liquid in real time according to the liquid pressure required by the auxiliary power device. In this way, the load sensitive system outputs the most economical pressure at different operation stages of the turbine fracturing apparatus. Compared with a method that an output of the piston pump is always kept at the constant highest pressure, the loss and waste of system power are reduced.

The present disclosure is described below through several specific embodiments. In order to keep the following description of the embodiments of the present disclosure simple and clear, the detail description of known functions and known components may be omitted. When any component of the embodiments of the present disclosure presents in one of the above drawings, the component is represented with same reference numerals in all drawings.

Figure 2:
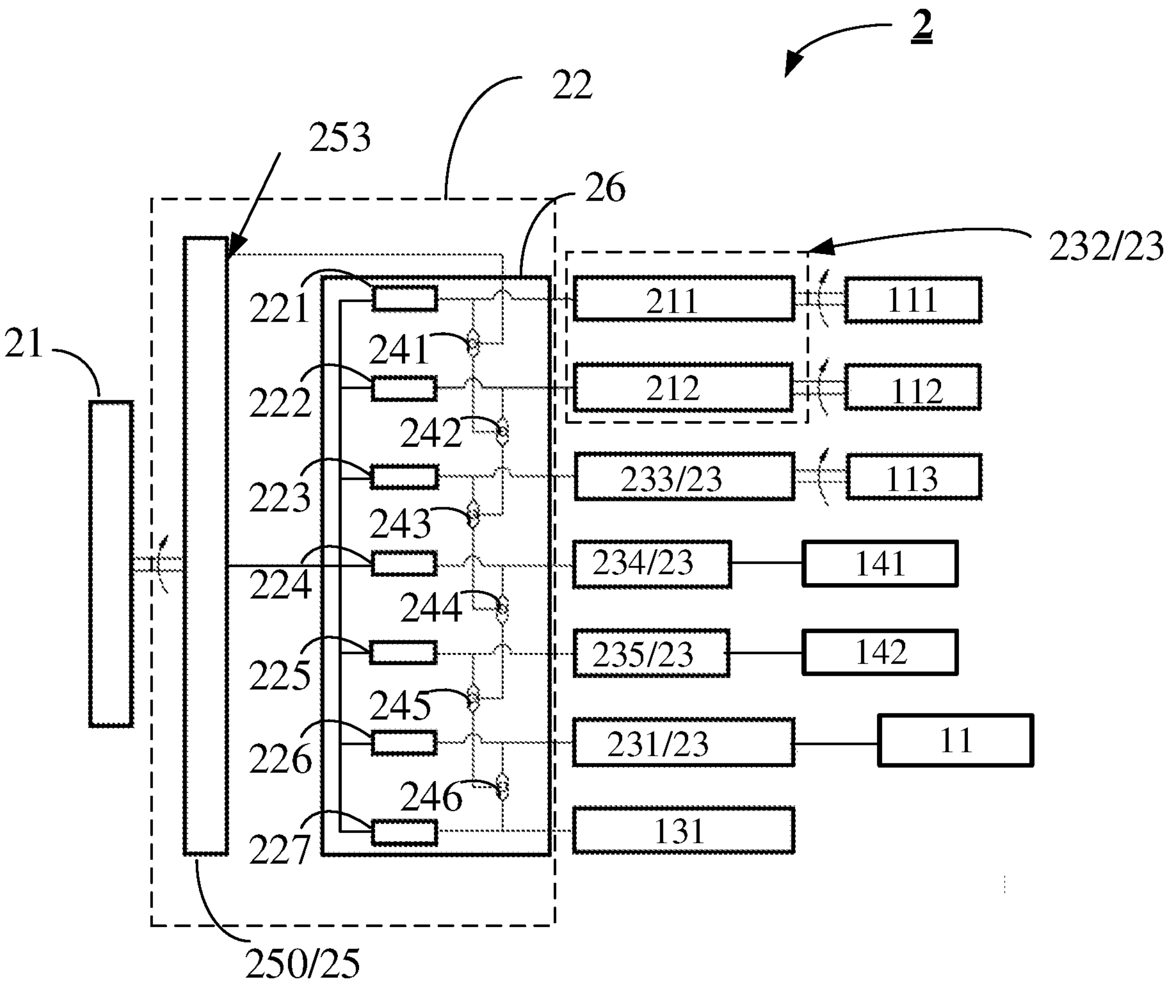
FIG. 2 is a structural block diagram of an auxiliary power assembly provided by an embodiment of the present disclosure.

FIG. 1 is a structural schematic diagram of a turbine fracturing apparatus provided by an embodiment of the present disclosure. FIG. 2 is a structural block diagram of an auxiliary power assembly provided by an embodiment of the present disclosure.

As shown in FIG. 1 and FIG. 2, at least one embodiment of the present disclosure provides a turbine fracturing apparatus, which includes a main power assembly 1 and an auxiliary power assembly 2.

As shown in FIG. 1, the main power assembly 1 includes a turbine engine 11 (i.e. first power source), a piston pump 12, a gearbox 13, an exhaust silencer 14 (i.e. exhaustion device), a transmission shaft 15 (i.e. transmission device) and an air intake device 16.

For example, the first power source includes an engine. The engine may be a diesel engine, and may also be an electric engine. The electric engine is, for example, a turbine engine. The present embodiment takes the turbine engine 11 as an example for description.

For example, a first end of the turbine engine 11 is connected with the exhaust silencer 14, and a second end of the turbine engine 11 is connected with the gearbox 13. The exhaust silencer 14 plays a role in reducing environment noise of the turbine engine. For example, the exhaust silencer 14 is provided with a first cover plate 141 and a second cover plate 142 for preventing foreign matters in the environment from falling into the exhaust silencer.

For example, the gearbox 13 is arranged between the turbine engine 11 and the piston pump 12. A main function of the gearbox is to change a transmission ratio and enlarge a variation range of a torque and a rotation speed so as to adapt to different working conditions, and also to make the turbine engine work under a favorable working condition. The turbine engine 11 drives the piston pump 12 to do work through the gearbox 13. When the piston pump 12 itself is provided with the gearbox, the turbine engine 11 may be connected with an input end of the gearbox of the piston pump 12 directly. For example, the gearbox includes a reduction gearbox.

For example, the transmission shaft 15 is arranged between the gearbox 13 and the piston pump 12. A main function of the transmission shaft is to transfer, together with the gearbox 13, the power of the turbine engine 11 to the piston pump 12, so that the piston pump 12 generates a driving force.

In the above main power assembly, the turbine engine 11 outputs power to the piston pump 12, so that the piston pump 12 pressurizes the first liquid, and the pressurized first liquid is pumped into an oil well so as to implement the fracturing operation.

For example, the main power assembly 1 further includes a lubricating device 102. The lubricating device 102 includes a piston pump lubricating assembly 111 for lubricating the piston pump 12 and a gearbox lubricating assembly 112 for lubricating the gearbox 13.

For example, the piston pump lubricating assembly 111 plays a role in providing the lubricant to the piston pump 12 and has functions of sealing, cooling, cleaning, corrosion prevention, rust prevention, etc.

The gearbox lubricating assembly 112 plays a role in providing the lubricant to the gearbox 13 and has functions of sealing, cooling, cleaning, corrosion prevention, rust prevention, etc. For example, the lubricant includes lubricating oil, including but not limited to mineral lubricating oil, synthesized lubricating oil, semi-synthesized lubricating oil, etc.

For example, the main power assembly 1 further includes a heat dissipating device 103. The heat dissipating device 103 includes a lubricant heat dissipating assembly 113 for cooling the lubricant. Since a great amount of heat may be generated in the working process of a pumping motor of the lubricating oil, the lubricant heat dissipating assembly 113 is connected respectively with the piston pump lubricating assembly 111 and the gearbox lubricating assembly 112 so as to dissipate the heat of the piston pump lubricating assembly 111 and the gearbox lubricating assembly 112.

As shown in FIG. 2, the auxiliary power assembly 2 includes an engine 21 (i.e. second power source), a load sensitive system 22 connected to the engine 21, and an auxiliary power device 23 connected to the load sensitive system 22. The auxiliary power assembly 2 plays a main role in providing auxiliary power to the main power assembly 1.

For example, as shown in FIG. 2, the load sensitive system 22 includes a load sensitive pump 25 and a load sensitive control device 26 connected with the load sensitive pump 25. The load sensitive pump 25 is, for example, a variable displacement piston pump 250. In the auxiliary power assembly 2, the engine 21 outputs power to the variable displacement piston pump 250, the variable displacement piston pump 250 sucks out the second liquid from a liquid storage cylinder (not shown in the drawing) with the second liquid, then pressurizes the second liquid, and outputs the pressurized second liquid into the auxiliary power device 23. Then, the auxiliary power device 23 provides auxiliary power to the main power assembly.

In the embodiments of the present disclosure, due to different application environments and different functions of the second liquid and the first liquid, the second liquid is different from the first liquid. That is, the material of the second liquid is different from the material of the first liquid, and the pressure and flow of the second liquid are also different from the pressure and flow of the first liquid.

For example, the first liquid includes fracturing liquid. After the first liquid is pressurized by the piston pump 12, the maximal pressure of the first liquid may reach 10000 psi, and the maximal flow may reach 2.7 $m^3$/min. The second liquid includes hydraulic oil. After the second liquid is pressurized by the variable displacement piston pump 250, the maximal pressure of the second liquid may reach 3500 psi, and the maximal flow may reach 500 L/min.

For example, as shown in FIG. 2, the load sensitive control device 26 includes a control valve group. The control valve group includes a plurality of control valves 221~227. The auxiliary power device 23 includes a plurality of actuating mechanisms. The plurality of control valves 221~227 are connected with the plurality of actuating mechanisms in one-to-one correspondence. In this way, the second liquid with the pressure regulated by the variable displacement piston pump 250 is conveyed into the plurality of actuating mechanisms through the plurality of control valves 221~227.

It may be understood that in the embodiments of the present disclosure, a liquid conveying pipeline is arranged respectively between the control valve and the actuating mechanism and between the control valve and the variable displacement piston pump and configured to convey the second liquid. The embodiments of the present disclosure do not have specific limitation on the type, material and specific layout of the liquid conveying pipeline, as long as the liquid conveying pipeline is suitable for conveying the liquid to a target position.

For example, as shown in FIG. 2, the plurality of actuating mechanisms (also called “actuating components”) include a first power source driving device 231, a lubricating assembly driving device 232, a heat dissipating assembly driving device 233, a first oil cylinder 234 and a second oil cylinder 235 both for the exhaust silencer 14.

For example, the first power source driving device 231 is connected with the turbine engine 11 and configured to drive the turbine engine 11. For example, the first power source driving device 231 is a turbine engine driving motor. In this way, the second liquid after being pressurized by the variable displacement piston pump 250 is conveyed to the turbine engine driving motor through the control valve 226.

For example, the lubricating pump driving device 232 includes a first lubricating driving assembly 211. The second liquid after being pressurized by the variable displacement piston pump 250 is conveyed to the first lubricating driving assembly 211 through the control valve 221. The first lubricating driving assembly 211 is, for example, a first lubricating pump driving motor, and the first lubricating pump driving motor is connected to the piston pump lubricating assembly 111, for example, connected to a first lubricating pump (not shown) in the piston pump lubricating assembly 111. The first lubricating pump plays a role in providing the lubricant to the piston pump 12. In this way, the pressurized second liquid is injected into the first lubricating pump driving motor, so that the first lubricating pump driving motor provides stable power output.

For example, the lubricating pump driving device 232 further includes a second lubricating driving assembly 212. The second liquid after being pressurized by the variable displacement piston pump 250 is conveyed to the second lubricating driving assembly 212 through the control valve 222. The second lubricating driving assembly 212 is, for example, a second lubricating pump driving motor (not shown), and the second lubricating pump driving motor is connected to the gearbox lubricating assembly 112, for example, connected to a second lubricating pump (not shown) in the gearbox lubricating assembly 112. The second lubricating pump plays a role in providing the lubricant to the gearbox 13. In this way, the pressurized second liquid is injected into the second lubricating pump driving motor, so that the second lubricating pump driving motor provides stable power output.

For example, the heat dissipating assembly driving device 233 is, for example, a heat radiator fan motor, which is configured to drive the lubricant heat dissipating assembly 113 of the main power assembly 1. The second liquid after being pressurized by the variable displacement piston pump 250 is conveyed to the heat radiator fan motor through the control valve 223. The pressurized second liquid is injected into the heat radiator fan motor, so that the heat radiator fan motor provides stable power output.

For example, each cover plate of the exhaust silencer 14 is provided with an oil cylinder for driving the cover plate. As shown in FIG. 2, the first oil cylinder 234 is configured to drive the first cover plate 141 to move or rotate, and the second oil cylinder 235 is configured to drive the second cover plate 142 to move or rotate. The first cover plate 141 and the second cover plate 142 may move to cover an outlet of the exhaust silencer 14 so as to prevent foreign matters from falling therein. The second liquid after being pressurized by the variable displacement piston pump 250 is conveyed respectively into the first oil cylinder 234 and the second oil cylinder 235 through the control valves 224 and 225. In this way, the pressurized second liquid is injected into the first oil cylinder 234 and the second oil cylinder 235, thereby providing stable power output to the cover plates 141 and 142.

For example, the control valve 227 is connected with a brake caliper 131 of the gearbox 13 and configured to drive the brake caliper 131. The second liquid after being pressurized by the variable displacement piston pump 250 is injected onto the brake caliper 131 through the control valve 227, thereby guaranteeing the normal work of the brake caliper 131.

Figure 3:
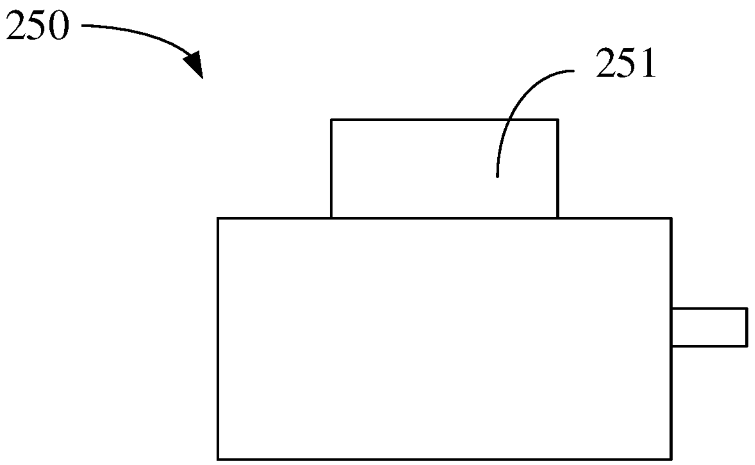
FIG. 3 is a structural block diagram of a variable displacement piston pump provided by an embodiment of the present disclosure.
Figure 4:
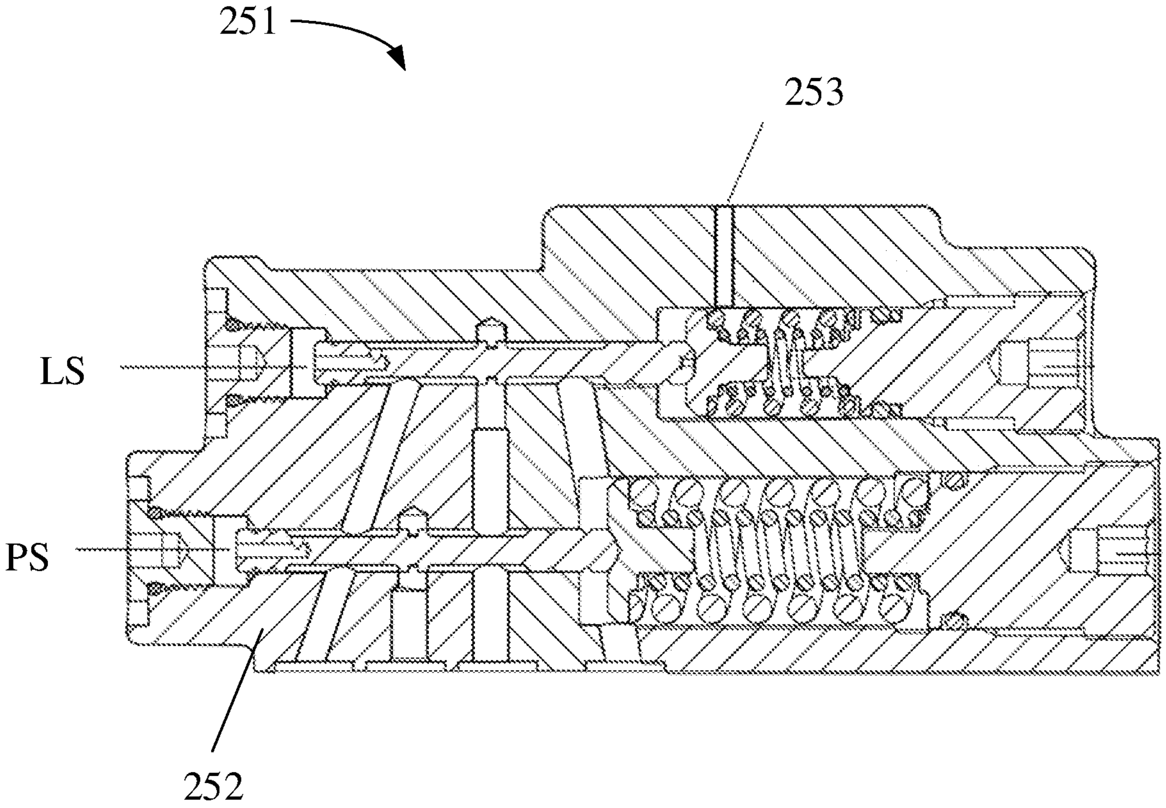
FIG. 4 is a sectional diagram of a control device of a variable displacement piston pump provided an embodiment of the present disclosure.

FIG. 3 is a structural block diagram of a variable displacement piston pump provided by an embodiment of the present disclosure. FIG. 4 is a sectional diagram of a control device of a variable displacement piston pump provided an embodiment of the present disclosure.

As shown in FIG. 3 and FIG. 4, for example, the variable displacement piston pump 250 has a load sensitive function. For example, the variable displacement piston pump 250 is provided with a control device 251, the control device 251 includes a low-pressure valve core LS and a high-pressure valve core PS, the low-pressure valve core LS sets the standby pressure P1 of the variable displacement piston pump, and the high-pressure valve core PS sets the highest pressure P2 of the variable displacement piston pump.

With reference to FIG. 2 and FIG. 4, the control device 251 is for example provided with a load induction port 253. The load induction port 253 is connected with the load sensitive control device 26 and configured to receive the highest liquid pressure required by the plurality of actuating mechanisms and fed back by the load sensitive control device 26. When the pressure of the load induction port 253 is zero, the highest pressure of an outlet of the variable displacement piston pump is P1 (about 300 psi), and the variable displacement piston pump 250 is in a low-pressure standby state. When the load induction port 253 senses that the pressure is P, then the pressure of the outlet of the variable displacement piston pump is P1+P. With the gradual increase of the induction pressure, the pressure reaches P2 from P. i.e. P1+P=P2. Through the above way, the variable displacement piston pump 250 may regulate the pressure of the second liquid outputted by the variable displacement piston pump 250 in real time according to the pressure of the second liquid required by the auxiliary power device 23.

For example, the control device 251 is further provided with a port 252, and the port 252 is connected with the outlet of the variable displacement piston pump 250 and configured to detect the pressure of the second liquid outputted from the variable displacement piston pump.

For example, as shown in FIG. 2, the load sensitive control device 26 further includes pressure comparison valves 241~246, and the pressure comparison valves 241~246 are communicated with the plurality of control valves 221~227 and configured to compare the pressure of the second liquid in the plurality of control valves 221-227 and feed back the highest liquid pressure required by the plurality of actuating mechanisms to the load sensitive pump 25.

For example, at least one pressure comparison valve is arranged between two adjacent control valves. For example, the pressure comparison valve 246 is arranged between the control valves 226 and 227 and configured to compare the pressure of the second liquid in the control valves 226 and 227 and output the higher of the two as a first pressure signal into the pressure comparison valve 245. For example, the pressure comparison valve 245 is arranged between the control valves 225 and 226 and configured to compare the pressure of the second liquid in the control valve 225 with the first pressure signal and output the higher of the two as a second pressure signal into the pressure comparison valve 244, and so on. The rest may be inferred until the last pressure comparison valve 241 executes the comparison, transmits the signal with the highest liquid pressure to the load induction port 253. The signal with the highest liquid pressure is transmitted into the control device 251 of the variable displacement piston pump 250 through the load induction port 253, thus the control device 251 regulates the pressure of the second liquid outputted by the variable displacement piston pump 250 in real time. In this way, the liquid pressure outputted by the load sensitive system is always associated with the actual pressure required by the auxiliary power device, thereby always outputting the most economical pressure at different operation stages of the turbine fracturing apparatus, and reducing the loss and waste of the system power.

For example, in the case that all actuating components connected by the control valve group do not act, the pressure of the outlet of the variable displacement piston pump 250 is P1, and at this time, the variable displacement piston pump is in a low-pressure standby state. In the case that one of the plurality of actuating components acts, the load sensitive control device 26 feeds back the pressure P required by the action of the actuating component to the variable displacement piston pump 250, and the pressure outputted by the variable displacement piston pump becomes P1+P (i.e., the sum of P1 and P). Because the single actuating component needs different pressure at different operation stages, the pressure outputted by the variable displacement pump 250 changes with the variation of P1.

In the case that two or more actuating components act, because the control valves have different pressure while different actuating components work, the variable displacement piston pump 250 receives the highest pressure Pmax required by the actuating components at work and fed back by the load sensitive control device 26 due to the presence of the pressure comparison valves in the load sensitive control device 26; and therefore, the pressure outputted by the variable displacement piston pump 250 becomes P1+Pmax. Due to that the high-pressure valve core PS in the control module of the variable displacement piston pump 250 limits the highest pressure of the variable displacement piston pump 250 is P2. P1+Pmax (i.e., the sum of P1 and Pmax) is less than or equal to P2.

It can be seen that, in the embodiments of the present disclosure, the load sensitive system is applied to the turbine fracturing apparatus, so that the pressure outputted by the variable displacement piston pump 250 is always associated with the actual pressure required by the actuating component. At different operation stages of the apparatus, the variable displacement piston pump 250 always outputs the most economical pressure, thereby greatly reducing the power waste of the power source.

FIG. 2 only illustrates that one variable displacement piston pump controls one control valve group, and only illustrates that seven control valves included in the control valve group control seven actuating components respectively. However, it should be understood that those skilled in the art may construct a similar load sensitive system by changing the quantity of the variable displacement piston pumps, the quantity of the control valve groups, the quantity of the control valves and the quantity of the actuating components according to actual requirements. As long as the load sensitive system is applied to the turbine fracturing apparatus, the objective of the present disclosure can be realized.

In the embodiments of the present disclosure, in the case that the quantity of the actuating components is large and the required liquid displacement is large, two or more variable displacement piston pumps and two or more load sensitive control device may be provided, thereby satisfying different working conditions and providing more economical operation ways.

Figure 5:
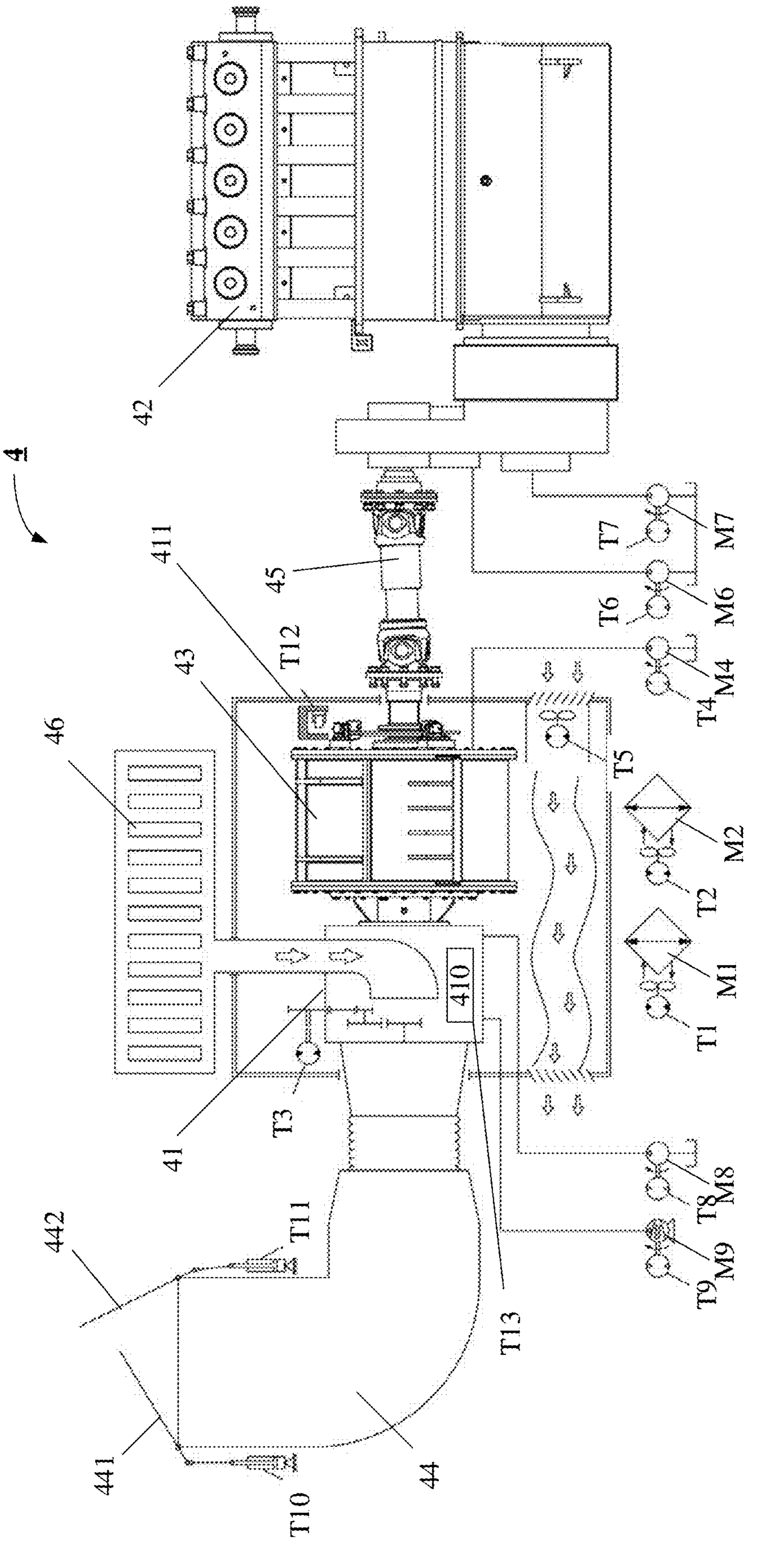
FIG. 5 is a structural schematic diagram of a turbine fracturing apparatus provided by another embodiment of the present disclosure.
Figure 6:
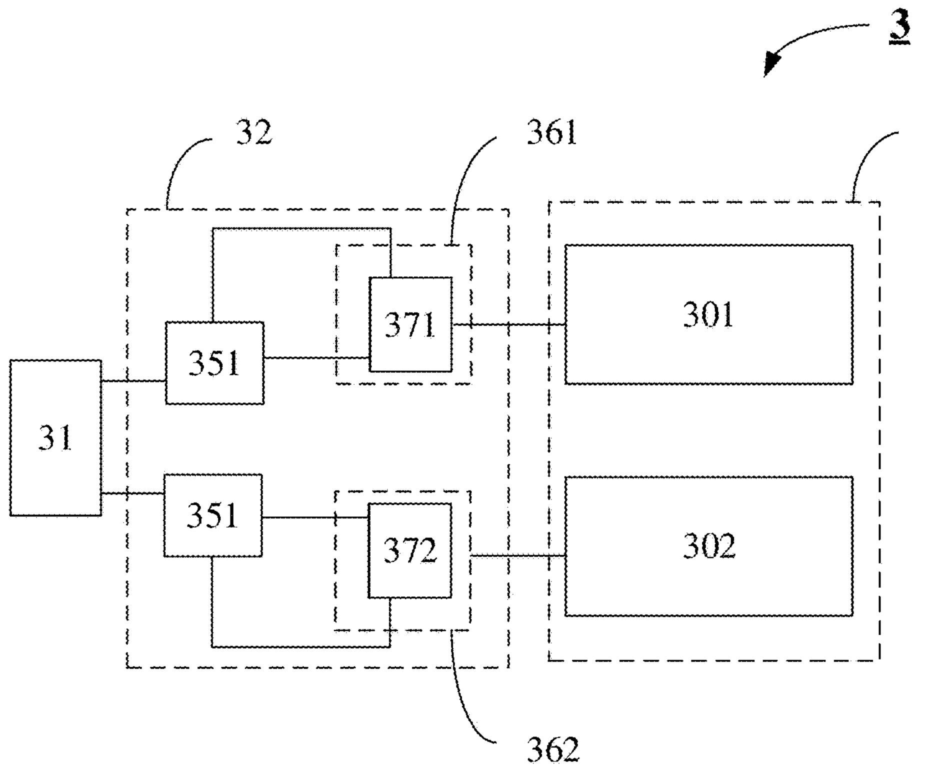
FIG. 6 is a structural block diagram of an auxiliary power assembly provided by another embodiment of the present disclosure.
Figure 7:
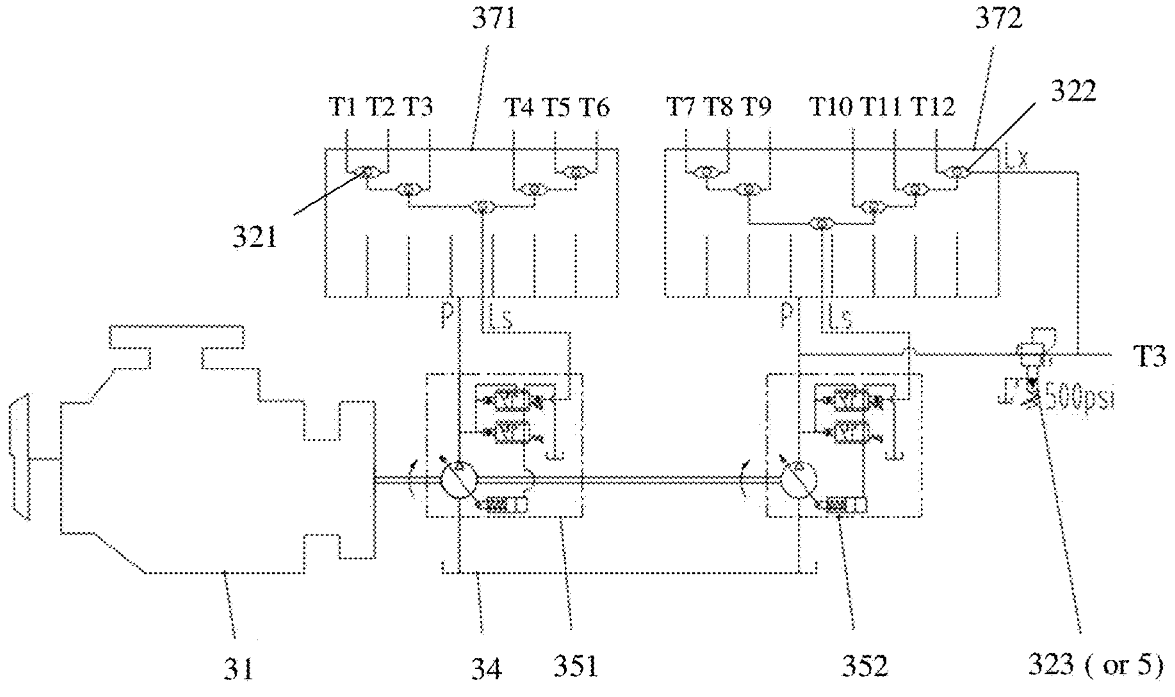
FIG. 7 is a structural schematic diagram of a load sensitive system provided by another embodiment of the present disclosure.

FIG. 5 is a structural schematic diagram of a turbine fracturing apparatus provided by another embodiment of the present disclosure. FIG. 6 is a structural block diagram of an auxiliary power assembly provided by another embodiment of the present disclosure. FIG. 7 is a structural schematic diagram of a load sensitive system provided by another embodiment of the present disclosure.

As shown in FIG. 5 to FIG. 7, at least one embodiment of the present disclosure provides a turbine fracturing apparatus, which includes an auxiliary power assembly 3 and a main power assembly 4.

As shown in FIG. 5, for example, the main power assembly 4 includes a turbine engine 41 (i.e. first power source), a piston pump 42, a gearbox 43, an exhaust silencer 44 (i.e. exhaust device), a transmission shaft 45 (i.e. transmission device) and an air intake device 46.

In the present embodiment, the specific structures and working principles of the turbine engine 41, the piston pump 42, the gearbox 43, the exhaust silencer 44, the transmission shaft 45 and the air intake device 46 in the main power assembly 4 may refer to the description of the same components in the above embodiments and are not repeated here.

As shown in FIG. 6, the auxiliary power assembly 3 includes an engine 31 (i.e. second power source), a load sensitive system 32 connected to the engine 31, and an auxiliary power device 33 connected to the load sensitive system 32. The auxiliary power assembly 3 plays a main role in providing auxiliary power to the main power assembly 4.

As shown in FIG. 6 and FIG. 7, for example, the load sensitive system 32 may include two load sensitive pumps, such as a first variable displacement piston pump 351 and a second variable displacement piston pump 352. The load sensitive system further includes a liquid storage tank 34 configured to store the second liquid. The first variable displacement piston pump 351 and the second variable displacement piston pump 352 both are connected with the liquid storage tank 34 and configured to suck the second liquid.

For example, the engine 31 outputs power to the first variable displacement piston pump 351 and the second variable displacement piston pump 352. The first variable displacement piston pump 351 and the second variable displacement piston pump 352 suck the second liquid from the liquid storage tank 34, then pressurize the second liquid, and output the pressurized second liquid into the auxiliary power device 33. The auxiliary power device 33 provides auxiliary power to the main power assembly.

For example, the auxiliary power device 33 includes a first group of actuating mechanisms 301 and a second group of actuating mechanisms 302. The first and second group each comprises one or more driving device. The driving device in the first group of actuating mechanism 301 and the driving device in the second group of actuating mechanisms 302 may be same, and may also be different. In the case that the quantity of the actuating mechanisms is large, the driving device in the first group of actuating mechanisms 301 may be set as being different from the driving device in the second group of actuating mechanisms 302, so that the hydraulic oil outputted by different variable displacement piston pumps into different groups of actuating mechanisms, thus satisfying different liquid flows and pressure required by different actuating mechanisms, and reducing the waste of energy.

For example, the load sensitive system 32 includes a first load sensitive control device 361 and a second load sensitive control device 362. The first load sensitive control device 361 is connected with the first variable displacement piston pump 351 and includes a first control valve group 371. The first control valve group 371 is connected with the first group of actuating mechanisms 301 and configured to provide the second liquid outputted by the first variable displacement piston pump 351 to the first group of actuating mechanisms 301. The second load sensitive control device 362 is connected with the second variable displacement piston pump 352 and includes a second control valve group 372. The second control valve group 372 is connected with the second group of actuating mechanisms 302 and configured to provide the second liquid outputted by the second variable displacement piston pump to the second group of actuating mechanisms 302.

As shown in FIG. 7, for example, the first control valve group 371 includes a plurality of first control valves T1, T2, T3, T4, T5 and T6. The second control valve group 372 includes a plurality of second control valves T7, T8, T9, T10, T11 and T12. The reference numerals T1~T12 of the above control valves in FIG. 7 correspond to the reference numerals T1~T12 of all actuating components in FIG. 5, which forms a driving relationship.

For example, the first group of actuating mechanisms includes a driving device for the first power source, a driving device for a heat dissipating device and a driving device for a lubricating device. Further, for example, as shown in FIG. 5, the first control valve T1 drives a fan motor connected to a heat radiator M1 of the hydraulic oil, turbine engine lubricating oil and gearbox oil. The first control valve T2 drives a fan motor connected to a heat radiator M2 of piston pump lubricating oil. The first control valve T3 drives a start motor of the turbine engine. The first control valve T4 drives a driving motor connected to a gearbox lubricating pump M4. The first control valve T5 drives a ventilation fan motor for a turbine engine cabinet 411. The first control valve T6 drives a driving motor connected to a high-pressure lubricating pump M6 of the piston pump.

In the present embodiment, the driving devices in the first group of actuating mechanisms 301 are different from the driving devices in the second group of actuating mechanisms 302. For example, the second group of actuating mechanisms 302 includes a driving device for the exhaust device. Further, for example, as shown in FIG. 5, the second control valve T7 drives a driving motor connected to a low-pressure lubricating pump M7 of the piston pump. The second control valve T8 drives a driving motor connected to a fuel oil pump M8 of the turbine engine. The second control valve T9 drives a driving motor connected to an air compressor M9. The second control valve T10 drives an oil cylinder connected to a first cover plate 441 of the exhaust silencer 44. The second control valve T11 drives an oil cylinder connected to a second cover plate 442 of the exhaust silencer 44. The second control valve T12 controls the brake caliper of the gearbox 43.

For example, the first load sensitive control device 361 further includes a first pressure comparison valve 321; and the first pressure comparison valve 321 is communicated with a plurality of first control valves T1~T6 and configured to compare the pressure of the second liquid in the plurality of first control valves T1-T6 and feed back the first highest liquid pressure required by the first group of actuating mechanisms 301 to the first variable displacement piston pump 351. For example, the first load sensitive control device 361 includes five first pressure comparison valves 321.

For example, the second load sensitive control device 362 further includes a second pressure comparison valve 322; and the second pressure comparison valve 322 is communicated with a plurality of second control valves T7~T12 and configured to compare the pressure of the second liquid in the plurality of second control valves T1~T12 and feed back the second highest liquid pressure required by a plurality of second groups of actuating mechanisms 302 to the second variable displacement piston pump 352. For example, the second load sensitive control device 362 includes six second pressure comparison valves 322.

In the present embodiment, the first highest liquid pressure and the second highest liquid pressure may be the same, and may also be different, and the values of the two are determined by the specific actuating mechanism.

In the present embodiment, the specific structures and working principles of the first variable displacement piston pump 351 and second variable displacement piston pump 352 may refer to the relevant description in the above embodiments and are not repeated here. The specific structures and working principles of the first control valves T1~T6 and the second control valves T7~T12 may refer to the relevant description in the above embodiments and are not repeated here. The specific structures and working principles of the first pressure comparison valve 321 and the second pressure comparison valve 322 may refer to the relevant description in the above embodiments and are not repeated here.

In the embodiments of the present disclosure, the pressure comparison valves 241~246, the first pressure comparison valve 321 and the second pressure comparison valve 322 are, for example, shuttle valves. In the working process, two load pressure in two adjacent control valves is introduced into the shuttle valves respectively, and every two are compared, so that a physical signal of the highest pressure may be finally outputted through the plurality of shuttle valves.

For example, as shown in FIG. 5 and FIG. 7, the turbine engine 41 further includes an air compressor guide vane valve 410. The auxiliary power assembly further includes a pressure reducing device 323, and the pressure reducing device 323 is communicated with both of the second control valve group 372 and the air compressor guide vane valve 410. After the second liquid is outputted from the second control valve group 372, the second liquid is conveyed to the air compressor guide vane valve 410 through the pressure reducing device 323. The pressure reducing device 323 is configured to control the pressure of the second liquid in the air compressor guide vane valve 410 to be constant pressure Pc.

In the present embodiment, the pressure reducing device is, for example, a pressure reducing valve 5. The pressure reducing valve 5 supplies oil to a compressor guide vane (CGV) control valve of the turbine engine. The CGV is a compressed air intake vane of the turbine engine, and an angle of the CGV may be changed by an actuator, and the actuator is controlled by a hydraulic valve. The CGV control valve requires an oil supply source to supply the oil with consecutive constant pressure of 500 psi. As such, the pressure reducing valve 5 is arranged in an oil supply pipeline, and the outlet pressure of the pressure reducing valve 5 is introduced into the second control valve group 372. In the case that other actuation components do not act, the second control valve group 372 feeds back the load pressure of 500 psi to the second variable displacement piston pump 352.

Thus, for the first variable displacement piston pump 351, in the case that the feedback of the liquid pressure is not received, the standby pressure of the outlet of the first variable displacement piston pump 351 is P1; and in the case that a liquid pressure signal P is received, the pressure of the outlet is changed into P1+P. For the second variable displacement piston pump 352, in the case that the feedback of the liquid pressure is not received, the standby pressure of the outlet of the first load sensitive pump is P1+Pc; and in the case that the liquid pressure signal P is received, the outlet pressure is changed into P1+P. Pc is, for example, equal to the outlet pressure of the pressure reducing valve, such as 500 psi.

In the turbine fracturing apparatus provided by at least one embodiment of the present disclosure, the load sensitive system is applied to the turbine fracturing apparatus, so that the pressure of the liquid outputted by the load sensitive system is always associated with the actual pressure required by the auxiliary power device, that is, the load sensitive system can regulate the pressure of the second liquid in real time according to the liquid pressure required by the auxiliary power device. In this way, the load sensitive system always output the most economical pressure at different operation stages of the turbine fracturing apparatus. Compared with a method that the output of the piston pump is always kept at the constant highest pressure, the loss and waste of system power are reduced.

The following points need to be noted herein:

(1) The accompanying drawings involve only the structure(s) in connection with the embodiment(s) of the present disclosure, and other structure(s) can be referred to common design(s).

(2) In case of no conflict, features in one embodiment or in different embodiments can be combined as a new embodiment.

(3) The foregoing embodiments merely are exemplary embodiments of the disclosure, and not intended to define the scope of the disclosure, and the scope of the disclosure is determined by the appended claims.

What is described above is related to the exemplary embodiments of the disclosure only, but the protection scope of the present disclosure is not limited to this. Any ordinary person skilled in the art can easily construct changes or substitutions within the technical scope disclosed in the present disclosure, and these changes or substitutions shall be encompassed by the protection scope of this disclosure. Accordingly, the protection scope of the disclosure should be defined by the accompanying claims.

The invention claimed is:

1. A turbine fracturing apparatus, comprising:
- a main power assembly, comprising a first power source for driving a main pump to output a first liquid; and
- an auxiliary power assembly, comprising:
  - a second power source;
  - a load sensitive system connected to the second power source, the load sensitive system comprising a load-sensitive pump and a control valve group; and
  - an auxiliary power device comprising a lubricating assembly driving device and a heat dissipating assembly driving device connected to the control valve group of the load sensitive system,
- wherein:
  - the second power source drives the load sensitive system to output a second liquid and convey the second liquid to operate the auxiliary power device via the control valve group;
  - the first liquid is different from the second liquid; and
  - the load sensitive system is configured to regulate a pressure of the second liquid from the load-sensitive pump in real time.

2. The turbine fracturing apparatus of claim 1, wherein the auxiliary power device further comprises a first power source driving device.

3. The turbine fracturing apparatus of claim 2, wherein the first power source is a turbine engine and the first power source driving device is configured to drive an auxiliary motor associated with the turbine engine.

4. The turbine fracturing apparatus of claim 3, wherein the auxiliary motor comprises a starter motor for the turbine engine.

5. The turbine fracturing apparatus of claim 2, wherein the first power source driving device, the lubricating assembly driving device, and the heat dissipating assembly driving device each comprises an actuating mechanism activatable by the second liquid.

6. The turbine fracturing apparatus of claim 5, wherein the main power assembly further comprises:
- a gearbox arranged between the first power source and the main pump;
- a lubrication device for lubricating the main pump and the gearbox; and
- a lubricant heat dissipation device for cooling a lubricant of the lubrication device.

7. The turbine fracturing apparatus of claim 6, wherein:
- the first power source driving device is configured to drive an auxiliary motor associated with the first power source;
- the lubricating assembly driving device is configured to drive the lubrication device; and
- the heat dissipating assembly driving device is configured to drive the lubricant heat dissipation device.

8. The turbine fracturing apparatus of claim 7, wherein the lubrication device comprises a first lubrication assembly for lubricating the main pump and a second lubrication assembly for lubricating the gearbox.

9. The turbine fracturing apparatus of claim 2, wherein the control valve group comprises a plurality of control valves respectively connected with the first power source driving device, the lubricating assembly driving device and the heat dissipating assembly driving device.

10. The turbine fracturing apparatus of claim 2, wherein the main power assembly further comprises an exhaust device connected with a first end of the first power source.

11. The turbine fracturing apparatus of claim 10, wherein:
- the auxiliary power device further comprises an oil cylinder for the exhaust device; and
- the control valve group is further configured to control the oil cylinder and to open or close the exhaust device.

12. The turbine fracturing apparatus of claim 2, wherein:
- the main power assembly further comprises a gearbox arranged between the first power source and the main pump;
- the gearbox comprises a brake caliper; and
- the control valve group is further configured to control the second liquid to activate the brake caliper of the gearbox.

13. The turbine fracturing apparatus according to claim 2, wherein the first liquid comprises a fracturing liquid, and the second liquid comprises a hydraulic oil.

14. The turbine fracturing apparatus according to claim 13, wherein the fracturing liquid has a highest pressure of 10000 psi and a maximal flow of 2.7 $m^3$/min, the hydraulic oil has a highest pressure of 3500 psi and a maximal flow of 500 L/min.

15. A turbine fracturing apparatus, comprising:
- a main power assembly, comprising:
  - a main pump;
  - a first power source for driving the main pump to output a first liquid;
  - a gearbox arranged between the first power source and the main pump;
  - a first lubrication device for lubricating the main pump;
  - a second lubrication device for lubricating the gearbox; and
  - a heat dissipation device for cooling a lubricant of the first lubrication device and the second lubrication device; and
- an auxiliary power assembly, comprising:
  - a second power source;

a load sensitive system connected to the second power source; and an auxiliary power device, wherein:

the second power source drives the load sensitive system to output a second liquid and convey the second liquid to operate the auxiliary power device to drive the first lubrication device, the second lubrication device, and the heat dissipation device;

the first liquid is different from the second liquid; and the load sensitive system is configured to regulate a pressure of the second liquid in real time.

16. The turbine fracturing apparatus of claim 15, wherein the load sensitive system further comprises:

a load-sensitive pump;

a control valve group;

a lubrication device driving assembly; and a heat dissipation device driving assembly;

wherein the control valve group is fluidly connected to the load-sensitive pump and configured to control the lubrication device driving assembly and the heat dissipation device driving assembly to drive the first lubrication device and the second lubrication device, and the heat dissipation device, respectively.

17. The turbine fracturing apparatus of claim 15, wherein the main power assembly further comprises an exhaust device connected with a first end of the first power source, wherein a second end of the first power source is connected with the gearbox.

18. The turbine fracturing apparatus of claim 17, wherein:

the auxiliary power device further comprises an oil cylinder for the exhaust device; and the load sensitive system is further configured to control the oil cylinder and to open or close the exhaust device.

19. The turbine fracturing apparatus according to claim 15, wherein the first liquid comprises a fracturing liquid, and the second liquid comprises a hydraulic oil.

20. The turbine fracturing apparatus according to claim 19, wherein the fracturing liquid has a highest pressure of 10000 psi and a maximal flow of 2.7 $m^3$/min, the hydraulic oil has a highest pressure of 3500 psi and a maximal flow of 500 L/min.

* * * * *